United States Patent
Ough et al.

(10) Patent No.: US 10,817,340 B2
(45) Date of Patent: Oct. 27, 2020

(54) AVAILABILITY FACTOR (AFACTOR) BASED AUTOMATION SYSTEM

(71) Applicant: Sungard Availability Services, LP, Wayne, PA (US)

(72) Inventors: Alex Ough, Austin, TX (US); Abayanathan Radhakrishnan, Duluth, GA (US); Gregory Cox, Crystal Lake, IL (US); Robert Don Peterson, Jr., Crofton, MD (US); Navakiran Chitturi, McKinney, TX (US); Susan Clark, Wayne, PA (US); Jerrel T. Loeppke, Shell Knob, MO (US); Joshua Crowe, Inlet Beach, FL (US)

(73) Assignee: Sungard Availability Services, LP, Wayne, PA (US)

(*) Notice: Subject to any disclaimer, the term of this patent is extended or adjusted under 35 U.S.C. 154(b) by 45 days.

(21) Appl. No.: 16/263,492

(22) Filed: Jan. 31, 2019

(65) Prior Publication Data
US 2020/0249997 A1   Aug. 6, 2020

(51) Int. Cl.
G06F 9/455   (2018.01)
G06F 9/50    (2006.01)

(52) U.S. Cl.
CPC ................... G06F 9/5027 (2013.01)

(58) Field of Classification Search
CPC .................................................. G06F 9/5027
See application file for complete search history.

(56) References Cited

U.S. PATENT DOCUMENTS

| | | | |
|---|---|---|---|
| 6,522,768 B1 | 2/2003 | Dekhil et al. | |
| 6,735,548 B1 | 5/2004 | Huang et al. | |
| 7,024,580 B2 | 4/2006 | Guimbellot et al. | |
| 8,386,495 B1* | 2/2013 | Sandler | G06F 16/951 707/748 |
| 9,215,158 B1 | 12/2015 | Adogla et al. | |
| 2004/0177244 A1* | 9/2004 | Murphy | G06F 9/5077 713/100 |
| 2006/0245354 A1* | 11/2006 | Gao | H04L 41/5096 370/230 |
| 2008/0049013 A1 | 2/2008 | Nasle | |
| 2010/0287403 A1 | 11/2010 | Jenkins et al. | |
| 2011/0225565 A1* | 9/2011 | van Velzen | G06Q 10/06 717/114 |

(Continued)

OTHER PUBLICATIONS

"BlockSim/RENO 2018 Quick Tour", p. 1-48 (2018).
(Continued)

*Primary Examiner* — Hang Pan
(74) *Attorney, Agent, or Firm* — VLP Law Group, LLP; David J. Thibodeau, Jr.

(57) ABSTRACT

An approach to improving system availability. Availability data for individual resources may be obtained from configuration templates and stored in an Availability Graph. The graph is traversed to calculate availability statistics at a grouped component and at an overall architecture level and grouping components level. Revisions may be made to enhance overall availability levels, and the revised Availability Graph can also be exported as an implementable configuration file. As a result, this solution provides a structured way to detect and resolve availability bottlenecks.

18 Claims, 12 Drawing Sheets

(56) References Cited

U.S. PATENT DOCUMENTS

2016/0085587 A1\* 3/2016 Dube .................... G06F 9/5005
  718/104
2017/0255474 A1\* 9/2017 Deng .................. G06F 11/1438

OTHER PUBLICATIONS

"Quick Start Guide, BlockSim Version 9 ReliaSoft", p. 1-118 (2014).
"Using Markov Diagrams in BlockSim for Availability Analysis", https://www.weibull.com/hotwire/issue183/hottopics183.htm, p. 1-5 (2018).
"Availability, MTBF, MTTR and Other Bedtime Tales", https://techthoughts.typepad.com/managing-computers/2007/11/availability-mt.html (2007).
"ReliaSoft Block Sim, RBDs, Fault Trees, Process Flows and Markov Diagrams", https://www.reliasoft.com/products/reliability-analysis/blocksim (2019).
International Search Report and Written Opinion dated May 19, 2020 for Related PCT/US2020/014104.

\* cited by examiner

AVAILABILITY FACTOR (AFACTOR) BASED AUTOMATION SYSTEM

REFERENCE TO COMPUTER PROGRAM LISTING

A computer program listing appendix submitted during the pendency of this application in accordance with 37 CFR 1.96 is hereby incorporated by reference.

TECHNICAL FIELD

This application relates to information technology (IT) system management, and more particularly to a tool that enables automated system availability analysis and deployment.

BACKGROUND

Availability has become a critical factor in many different types of systems and products, including information technology (IT) systems, computer and telecommunication networks, web applications, on-line transaction processing, and the like. System availability is generally defined as the probability that a system will function when needed. Availability statistics are ideally considered during a design phase, to enable system architects to use predicted properties to refine design decisions. Availability analyses can also provide the ability to trade-off implementation choices between cost and reliability.

Tools that assist with assessing availability are already known. For example, U.S. Pat. No. 6,735,548 issued to Huang et al., produces an availability graph given the topology of a communications network. The network topology can be developed using a network design tool, or imported from a database.

U.S. Patent Publication 2010/0287403 describes another tool that calculates availability on a per demand basis. The tool may be used to plan and/or suggest changes to a network design to improve overall availability.

BlockSim, available from ReliaSoft Software (HBM Prenscia) of Tucson, Ariz., enables analyses of expected reliability and availability using reliability block diagrams (RBDs) and Markov analysis. Each block in an RBD represents a component of an overall system or process. The individual blocks can be assigned a reliability measure. The reliability measures for each specified component in a system are then used in a calculation of overall system reliability. A user interface enables making subsequent changes to the model and observing differences in system reliability. System availability can be determined using discrete event simulation and Markov diagrams. See "Using Markov Diagrams in BlockSim for Availability Analysis". Reliability Engineering Resources Topic 183, (Weibull.com) May 2016 (https://www.weibull.com/hotwire/issue183/hottopics183.htm)

SUMMARY

We have developed a tool that accepts a description of resources as an input, such as may be available from a cloud service configuration template. The template is analyzed to generate a graph that we call an Availability Graph, where the nodes in the graph represent a resource or a collection of resources, and links (edges) in the graph represent relationships between nodes. The Availability Graph is annotated with an anticipated availability level for the resources, taking into account these relationships between resources. The Availability Graph, as annotated, can then be analyzed to determine an anticipated availability for the overall system (or related groups of resources).

A visual display of the resulting Availability Graph enables a system architect to determine where availability bottlenecks exist, and make adjustments. A revised template reflecting such changes can then be exported and used to deploy an improved system.

An Availability Graph is the graphical representation of an infrastructure template showing the relationships of resources and the corresponding availability for items in the graph, and the entirety of the template's relevant infrastructure.

A Resource Graph is a graph that identifies resources, relationships, and default availability for resources. Different environment models are modeled as Resource Graphs with nodes representing the different resources, such as AWS services and custom services, along with the relationships between the services represented as links between the nodes.

Availability Graphs are generated from input configuration files that may be obtained in the form of commonly used cloud specification files. Some example input configuration files include AWS CloudFormation templates and/or Terraform configuration files.

These templates then are provided as input to an Availability Factor (AFactor) Analysis function. AFactor may analyze the template(s) using an appropriate Resource Graph.

The resulting Availability Graph represents the various system functions or resources as nodes, and with edges that represent dependencies of each resource on other resources. AFactor may then analyze the graph and calculate an anticipated availability based on these dependencies. The anticipated availability value(s) may be selectively displayed with the nodes in the Availability Graph at a component level, a grouped component level, or an overall architecture level.

The user may then make changes to the nodes, dependency edges, and attributes in the Availability Graph in an effort to enhance the availability levels. A graph database maintained by AFactor may thus retain these relationships among resources under various configurations as they are created, modified or deleted. Revised templates can then be generated from the revised Availability Graph and exported as one or more implementable configuration file(s).

The Availability Graphs may also be displayed in different ways. For example, an arrangement where a given node relies upon multiple underlying resources may be represented as a single group node. These dependencies may also be tiered across different levels and/or indicated across a given level. In addition, when the availability value of a specific resource from the input configuration template is not available in its target Resource Graph, it may instead originate from user input and/or maintained in other sources accessible to AFactor.

The Availability Graphs may also be annotated with shading or colors that assist with identifying bottlenecks. For example, nodes may be shaded in red, yellow, or green depending on the relative availability associated with the nodes. The user may specify thresholds used to determine the coloring or shading.

DETAILED DESCRIPTION OF A PREFERRED EMBODIMENT

Architected solutions for IT systems and applications typically have an associated measure of Availability that may be embodied in resilience, reliability, Service Level Objectives (SLOs) and/or Service Level Agreements (SLAs) for individual resources. There is a need to establish a common methodology for measuring the overall availability of an application or service, especially in a hosted environment such as a cloud environment. The methodology should include a mechanism for a system designer to compare architectures in a consistent manner, and provide the ability to discover and recommend enhanced solutions.

Briefly, the approach described herein:

1) analyzes service and/or application architectures as can be obtained from configuration templates, and provides a view of expected availability level for each resource, co-related groups of resources, and/or an overall anticipated availability; and 2) acts as a graphical user interface, enabling adjustment of system configuration to improve resource availability, enabling enhanced designs for automated deployment.

More particularly, the availability tool provides the flexibility of processing various infrastructure configuration artifacts such may be determined from CloudFormation templates and/or Terraform configuration files. These configuration templates may include a variety of text-based formats such as JSON and YAML files. The tool analyzes the configuration template and outputs an Availability Graph that includes various nodes and links, with the Availability Graph including anticipated availability statistics. The availability data for each of the individual resources is obtained from the Resource Graph but can be edited inside the user interface. The availability is calculated at both an overall architecture level and grouping components level. Furthermore, the tool provides the ability to make changes to the nodes, links, and attributes of the Availability Graph to enhance overall availability levels. The Availability Graph can also be exported as implementable configuration files. As a result, this solution provides a structured way to detect and resolve availability bottlenecks.

Figure 1A:
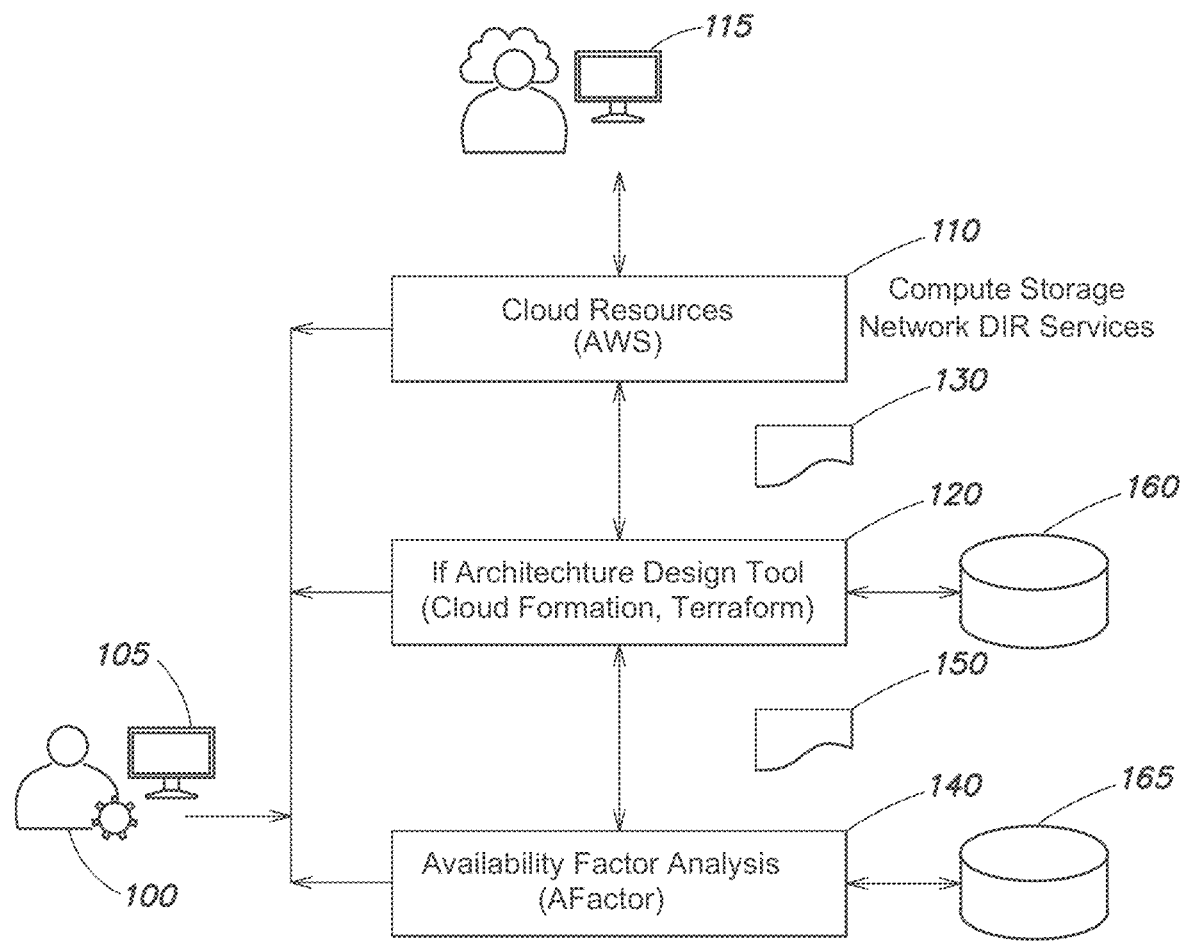
FIG. 1A illustrates an example implementation of an Availability Factor (AFactor) analysis function deployed within a cloud computing framework.

FIG. 1A is an example implementation where a system architect 100 (also referred to as a designer herein) uses one or more Graphical User Interface(s) 105 to access one or more design tools 120 to specify a design, such as an information technology (IT) infrastructure, service or application. In this example, the infrastructure, service and/or application(s) are deployed via cloud-based computing resources 110 available from services such as Amazon Web Services (AWS), Google Cloud, Microsoft Azure, IBM SmartCloud, Rackspace ManagedCloud, or similar service that provides a virtual cluster of computers on-demand. As is well known, these services allow subscribers to implement IT system deployments through specialized tools (typically accessed through web applications). These services often provide configuration tools that provide a window into a user's assigned virtual resources, letting the user configure and deploy the virtual systems for use by end users 115, similar to how they would use a physical computer.

The deployed cloud resources 110 may include compute, storage, networking, or directory services as well as other resources such as database, application services, analytics engines, developer tools and the like.

The designer 100 may also make use of the GUI 105 to access Architecture Design tools 120 to assist with describing and provisioning the resources. Amazon CloudFormation, for example, enables a user to provision and manage stacks of AWS resources. A CloudFormation template 130 can specify anything from a single Amazon Elastic Compute (EC) instance to a complex multi-tier, multi-region application. A CloudFormation template serves as a blueprint to define the configuration of the AWS resources 110 that make up a service and/or application stack. Sample prebuilt templates are also available via CloudFormation and third parties. For example, one popular prebuilt reference template is a so-called LAMP (Linux, Apache, MySQL, PHP) stack running on a single Elastic Compute instance. (Availability Graphs for a Drupal Hosting reference template are discussed as one example below). CloudFormation templates 130 can thus be used to manage one or more stacks or collections of resources that can be managed as a single unit.

Once the designer 100 is satisfied with a design template 130, they can select parameters such as the number of instances (or instance type), and CloudFormation 120 will then provision and configure assigned AWS resource stack(s) through an AWS management console, command line, or SDK interface.

Third party tools such as Terraform 120 can also be used to generate and manage configuration template files across different cloud service providers as well as custom in-house solutions. Terraform configuration files 130 can describe the components needed to run a single application or even an entire datacenter. Terraform can also generate an execution plan needed to build the described infrastructure. The infrastructure Terraform can manage includes low-level resources such as compute instances, storage, and networking, as well as high-level resources such as DNS servers, SaaS stacks, etc.

With this templated approach, be it via CloudFormation or Terraform the infrastructure is now described using a high-level configuration syntax. Such templates can also be stored 160 for further access within the context of the system(s) described herein.

An additional aspect of the environment shown in FIG. 1A is a tool referenced herein as Availability Factor (AFactor) Analysis 140, also accessible to the designer 100 via a GUI 105. AFactor 140 may be a standalone, web accessible application. As will be explained in more detail below, AFactor collects, annotates, and displays availability data to the system architect.

As explained above, AFactor generates an Availability Graph 150 which is a repository for storing availability data. The Availability Graph 150 includes nodes that represent resources, and links between nodes that represent dependencies of the resources upon other resources. The graph may also represent other relationships between based on their configuration. Availability related relationships between the services, and dependencies between services, are modeled in the Resource Graph as links (also called edges or vertices of the graph). Both nodes and links can have additional attributes that can then be used in the Availability Level calculations.

When a new Availability Graph is to be created from a configuration template like AWS CloudFormation or Terraform, a first step is to retrieve necessary logic to build the Availability Graph from information represented in the Resource Graph. A graph database 165 is preferred over some other structure, such as a relational or non-SQL database, because a Resource Graph can store not only the availability data for each individual resource, but also data for relationships among groups of resources.

The Availability Graph is then further processed to determine additional availability statistics. For example, a given resource is analyzed to determine if it has any dependencies on other resources. The availability factor for that given resource is then re-calculated based on those dependencies and stored with that resource node in the Availability Graph.

The GUI 105 can then provide an ability for an architect 100 to review the Availability Graph. The GUI 105 also permits the designer, in the context of the AFactor tool 140, to not only review the availability data but also make revisions to the graph in response to review of that data.

The revised Availability Graph may then be exported back to a template compatible with the cloud service being used (e.g., a CloudFormation template, or a Terraform configuration, or whatever design exchange format the architect is using). The revised template can then be deployed to AWS or some other cloud platform.

Figure 1B:
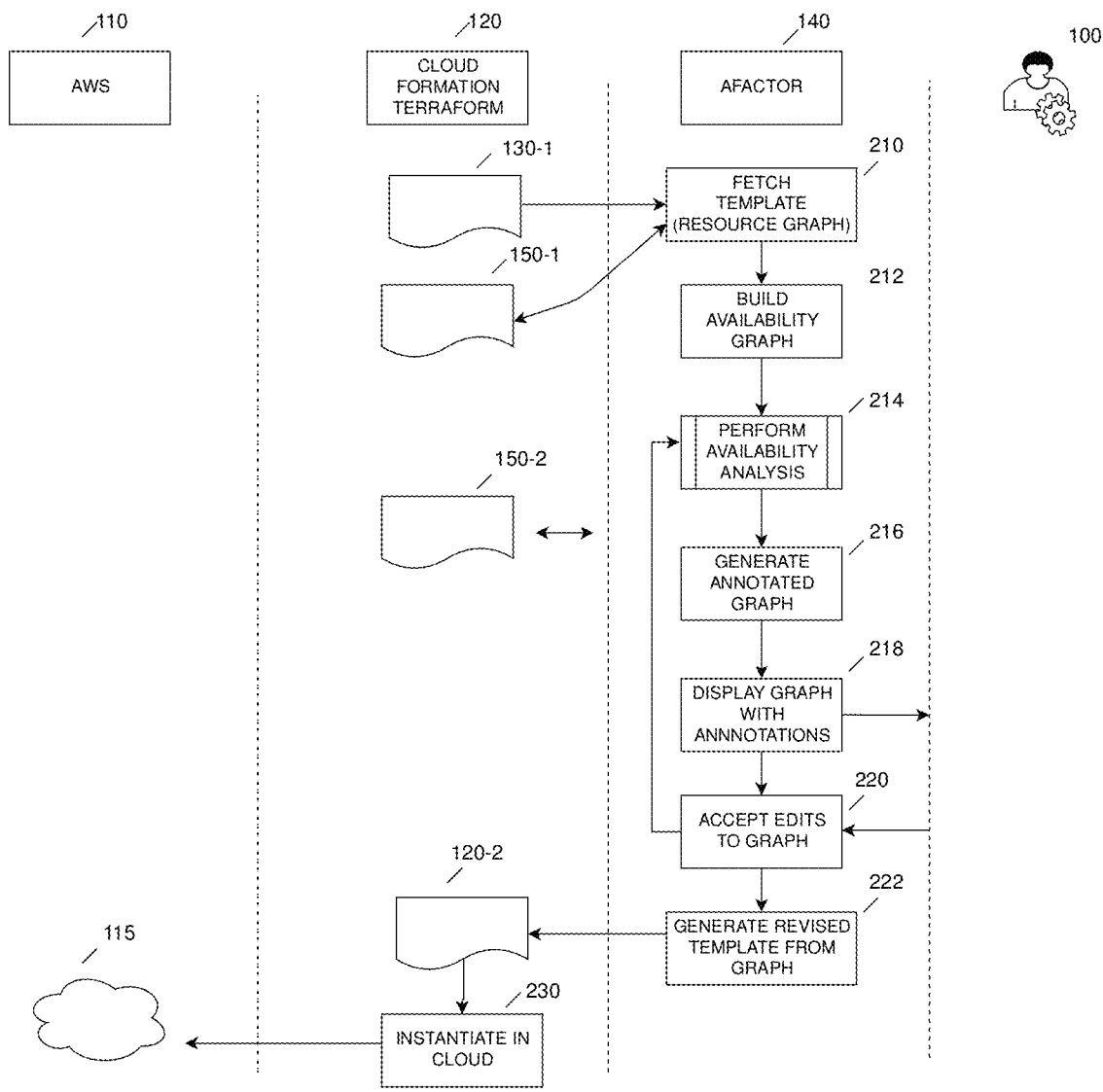
FIG. 1B is a process flow.

FIG. 1B is a process flow diagram showing these steps as performed by AFactor 140, as well as the data exchanged with the Architecture Design tool 120 and the designer 100. In a first state 210, an input configuration template 130-1 is fetched such as from the Architecture Design tool. Next, AFactor 140 builds 212 an initial version of the Availability Graph 150-2 from a Resource Graph 150-1 (and/or directly from a manifest in the configuration file 130), and from any interrelations between resources.

The Availability Graph 150-2 is then further annotated with additional availability data. In one example, AFactor 140 performs a further availability analysis (step 214) on the Availability Graph 150-2 to generate this additional availability data. This analysis 214 may involve retrieving availability statistics for the individual resources, such as may be automatically extracted from the Resource Graph. In other instances, the Availability data may also be provided from other sources such as published Service Level Agreement (SLA), published historical availability statistics for cloud resources or personal experience of the architect himself.

The further availability analysis may then further involve examining relations, such as dependencies between the nodes, and state information for the nodes in the Availability Graph 150-2. These relations typically include dependency relationships such that to function properly, a given resource must have access to one or more other resources that are themselves properly functioning. For example, an availability for the Availability Graph in whole or in part can be determined by analyzing the graph as an interconnection of parts in series and parallel. When two nodes are connected in series, failure of one node leads to failure of both nodes; thus, the overall availability of the two nodes is assigned a value that depends upon a product of the availability of the two nodes. When two nodes are operating in parallel, failure of one node does not impact the other node. Thus, the combined availability of nodes in parallel can be shown to depend on the node having the lower availability. These calculated statistics can then be annotated 216 to the corresponding nodes in the Availability Graph as stored in the graph database 165.

Availability for a specific resource may also depend upon relationships with other resources. For example, a given resource may have one availability under one set of conditions, but another availability under another set of conditions.

Next, the data in the annotated Availability Graph 150-2 may be displayed 218 via the GUI 105. The GUI 105 permits the designer 100 to view and edit 220 the content of the Availability Graph 150-2. The graph edit process 220 may be interactive. For example, when the user makes edits to a visual representation of the graph, the underlying Availability Graph and its interconnections are updated. The availability statistics are also updated, and the updated availability statistics are also displayed.

Once the user is satisfied with a Availability Graph and its expected "Total Availability" (as noted in the left corner of FIG. 4), AFactor may then use the revised Availability Graph to automatically generate 222 an exported configuration template 130-2. The updated template 130-2 is then exported in a form that can be interpreted by the cloud service provider 110. For example, the Availability Graph may be used to generate an exported CloudFormation or Terraform template 130-2. The exported template may then be used to deploy (instantiate) 230 the application or service on the cloud provider 115.

As a result, the architect 100 no longer has to manually create or update the relationships in the template to reflect changes she makes to improve availability.

Figure 2:
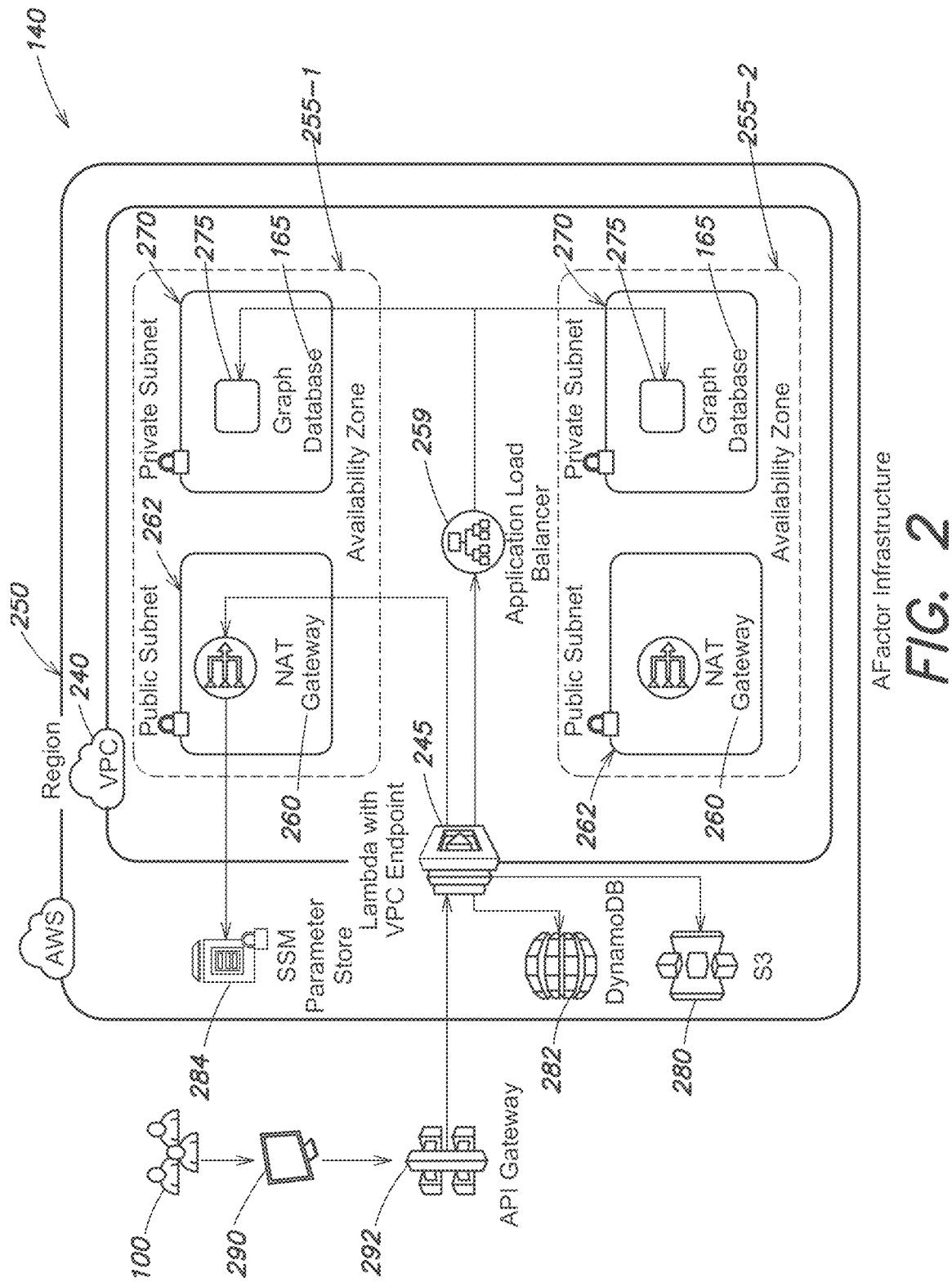
FIG. 2 is a representative implementation of AFactor as a cloud service.

AFactor 140 may itself be instantiated as cloud service as shown in the example of FIG. 2. The logic for AFactor may be implemented as Lambda code running on an Amazon Virtual Private Cloud (VPC) 240 endpoint 245 within an AWS Region 250 via Gateway 292. Customer-specific data may be accessed by the VPC via a load balancer 259 that includes two or more Availability Zones 255-1, 255-2. Each Availability Zone 255 may include a NAT gateway 260 linking to a public 262 and private subnet 270 having one or more graph databases 160, 165 that store the particular user's Availability Graph 275 and other data. Other functions such as an S3 storage instance 280, SSM Parameter Store 284, and Dynamo Database 282 may be provided to further assist with implementing the cloud-hosted AFactor application 140.

The included Appendix includes an example CloudFormation template file named AFactorText_2LB.txt.

Figure 3A:
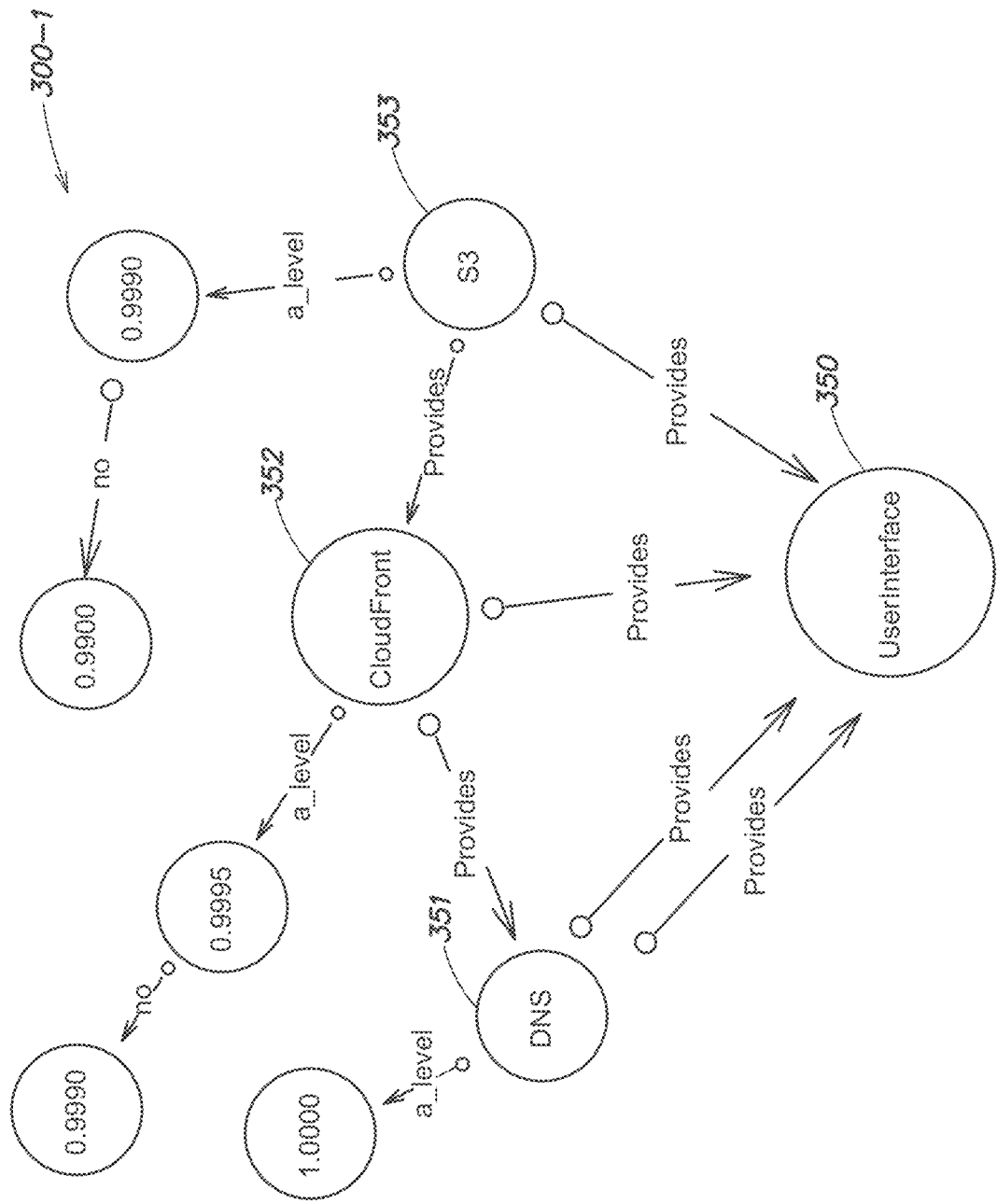
FIGS. 3A and 3B are example Resource Graphs.
Figure 3B:
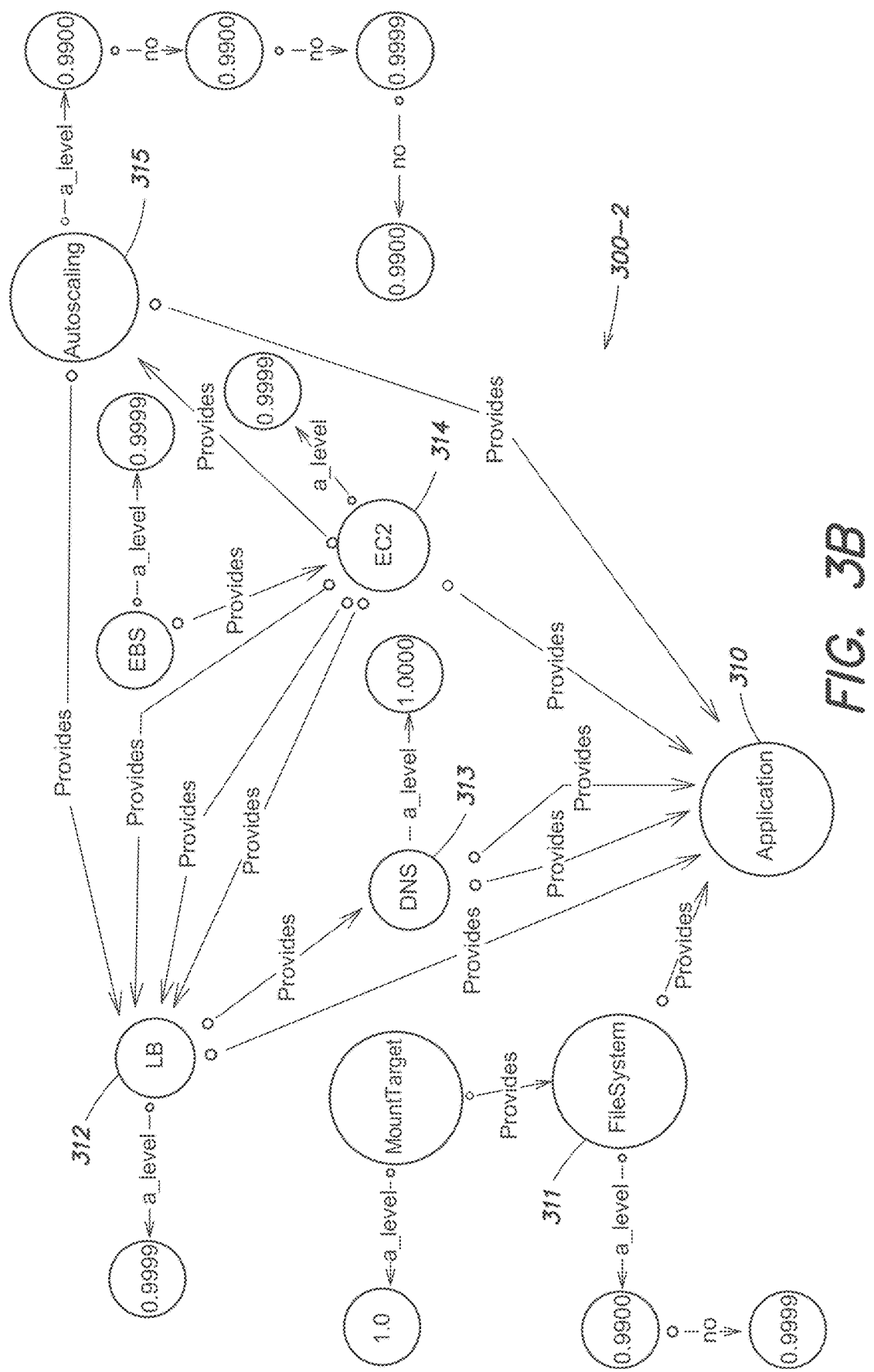

FIG. 3A is an example Resource Graph 300-1 for a user interface, and FIG. 3B is an example Resource Graph 300-2 for a web application. As explained briefly above, a Resource Graph is a graph that identifies cloud resources and customer services, relationships between those resources/services, and a default availability for each resource/service. Each environment (or application) type is associated with a Resource Graph when the template is imported. The combination of the template and the associated Resource Graph enable the Availability Graph to be created with the appropriate relationships and expected overall availability numbers. Resource Graphs may be chosen by an architect/designer from a library of Resource Graphs that have been pre-selected for use within a particular environment.

For example, if an architect/designer wanted to evaluate an application that has resources related only to a User Interface, then the UserInterface Resource Graph 300-1 of FIG. 3A would be utilized as a starting point. If they were instead wanting to evaluate a Web application, then the SimplifedWebApp Resource Graph 300-2 of FIG. 3B might be utilized.

The example Resourve Graph 300-1 in FIG. 3A for the UserInterface includes three first-level resources—namely a DNS service 351, a CloudFront service 352, and S3 storage instance 353.

The example Resource Graph 300-2 in FIG. 3B for the web application 310 is seen to include several first-level nodes, including a filesystem 311, a load balancer 312, a DNS server 313, an Elastic Compute (EC2) 314 and Autoscaling 315.

Availability statistics are seen to be associated with each of the resources on which the web application 310 depends. The DNS server 313 itself has an availability (a_level) of 1.00. The Load Balancer 312 and EC2 314 have an a_level of 0.9999. The filesystem 311 and AutoScaling 315 however have only a 0.9900 availability.

Some of the resources in FIG. 3B, such as AutoScaling 315, have "tiered" availabilities such that the availability depends on that template's configuration at the specific time. AFactor thus accounts for this possibility when it can. In this example, the FileSystem 311 has an availability of either 0.9999 or 0.9900, depending on some other operating condition.

Note also that there are other operational dependencies at subsequent levels of the tree. For example, EC2 314 depends on an Elastic Block Store (EBS) 317 and the associated a_level of 0.9999 for the EBS 317, and thus the actual expected availability is the combination of the two (0.9999) *(0.9999) or 0.9998.

Note also in the example of FIG. 3A, that S3 353 depends on CloudFront 352 and that CloudFront 352 in turn depends on the DNS 351. CloudFront has an a_level of 0.9995 or 0.9990 and S3 an a_level of either 0.9990 or 0.9900, such that a levels for those resources in turn depend on the templates' configuration parameter(s) at a particular time.

Manual computation of the overall availability of the Application 310 or Userinterface 350 thus becomes somewhat cumbersome. But AFactor 140 can automatically determine an Availability Graph that has the expected availability statistic for a group of nodes, or even an entire system, by determining the current configuration, traversing a graph to discover nodes in parallel and in series with other nodes, and discovering dependencies between nodes.

Figure 4:
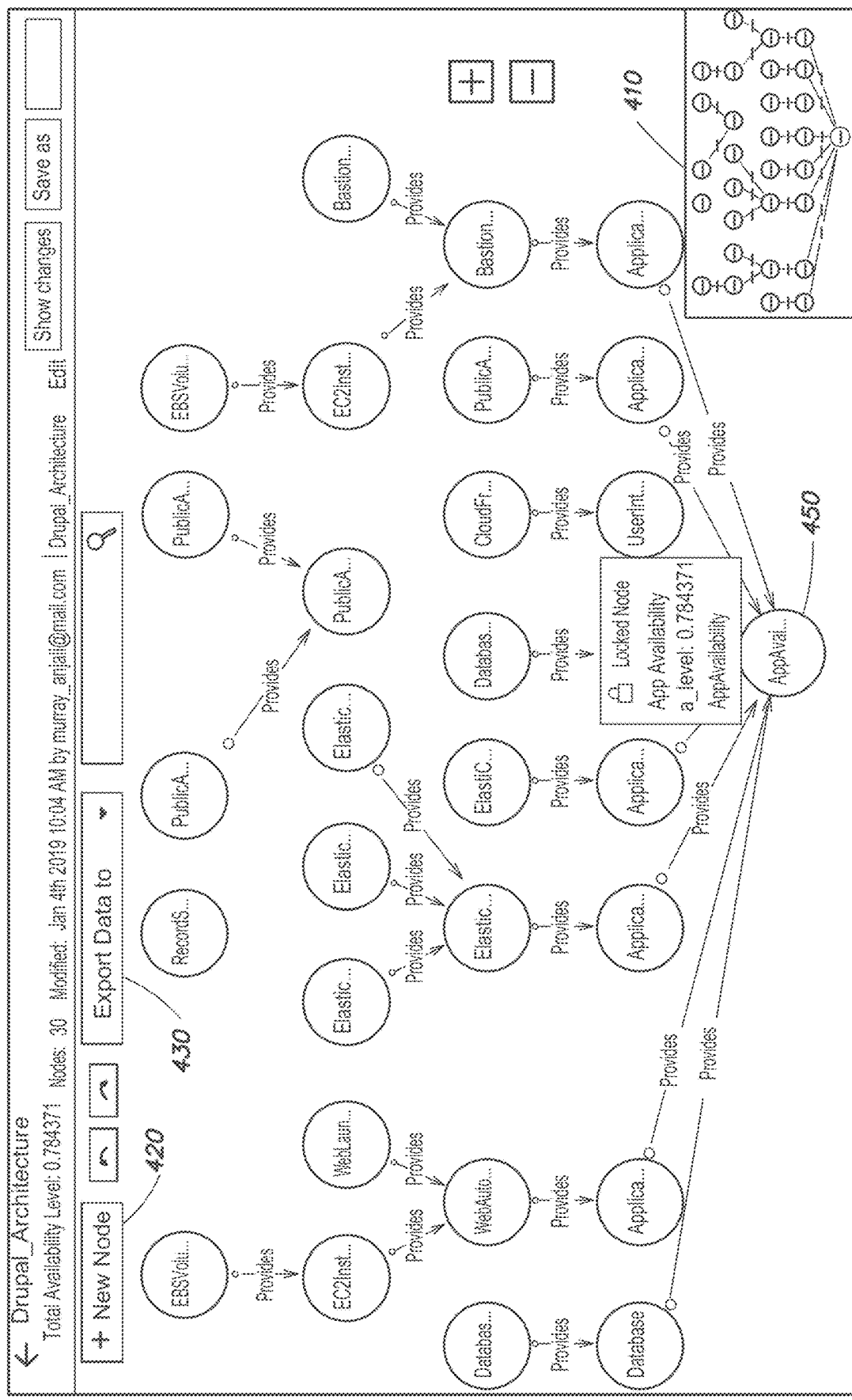
FIG. 4 is an example user interface that displays an annotated Availability Graph.

FIG. 4 is an example of the graphical user interface (GUI) 150 display that presents an Availability Graph 400 for a Drupal Reference Architecture. Initially, the graph may be displayed without the availability annotations, or even without showing all levels of nodes in the graph. Thus, in some arrangements, information relating to different elements of the Availability Graph 400 may be "bubbled" up into a single node, to make viewing the graph 400 in a larger context easier. The GUI may thus also permit the user to manipulate the graph, expand and collapse the nodes in the graph, and to other explore dependencies that results in the calculated availability for the overall system or parts of the system.

It is understood that the display may only show a portion of the Availability Graph 400. Thus, a viewport 410 shown on the lower left of the GUI may represent a panned-out view of a greater portion of the graph when the designer 100 is working with a complex Availability Graph for a system having may nodes.

Options are provided within the GUI 105 to add New Nodes 420, or to Export Data 430 from the Availability Graph to a configuration template file that can be used to instantiate the service.

Figure 5:
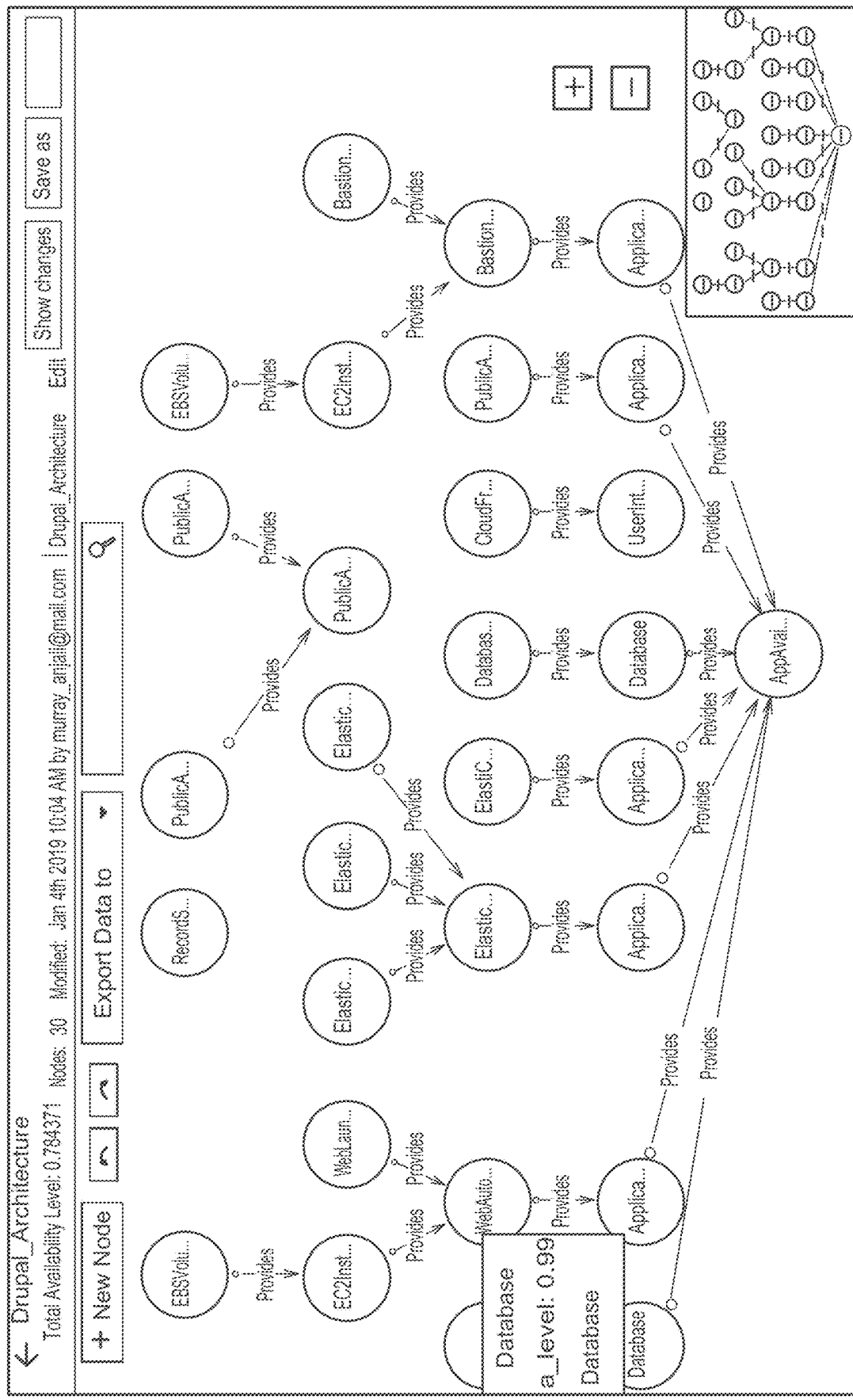
FIG. 5 shows how a user may explore the Availability Graph.
Figure 6:
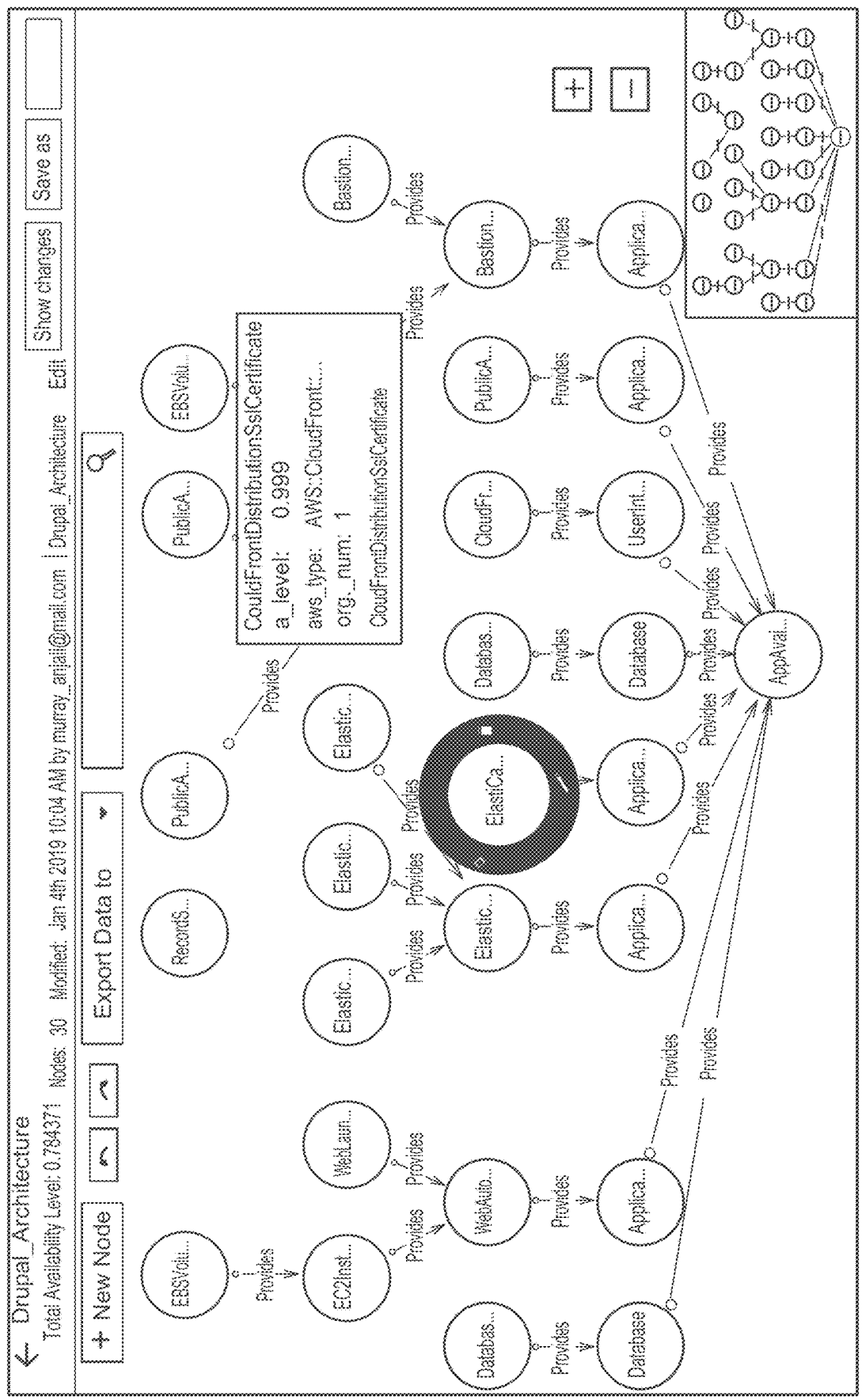
FIG. 6 illustrates how a user may further explore the Availability Graph.

In the particular instance shown in FIG. 4, the user has hovered an input device, such as a mouse cursor, over the AppAvailability node 450 to see that the overall calculated availability is only 0.784371. This may prompt the user to further visually explore the graph to discover the resources or links that cause this result. As shown in FIG. 5, the user may subsequently hover over the database node on the left-hand side and see that resource has an availability (a_level) of 0.99. And as shown in FIG. 6, the user may hover over the CloudFrontDistributedCertificate resource seeing that has an availability (a_level) of 0.999. The user may thus similarly "visit" other resources with the mouse cursor in an attempt to determine which resource(s) are causing the relatively low overall availability value of 0.784371.

Figure 7:
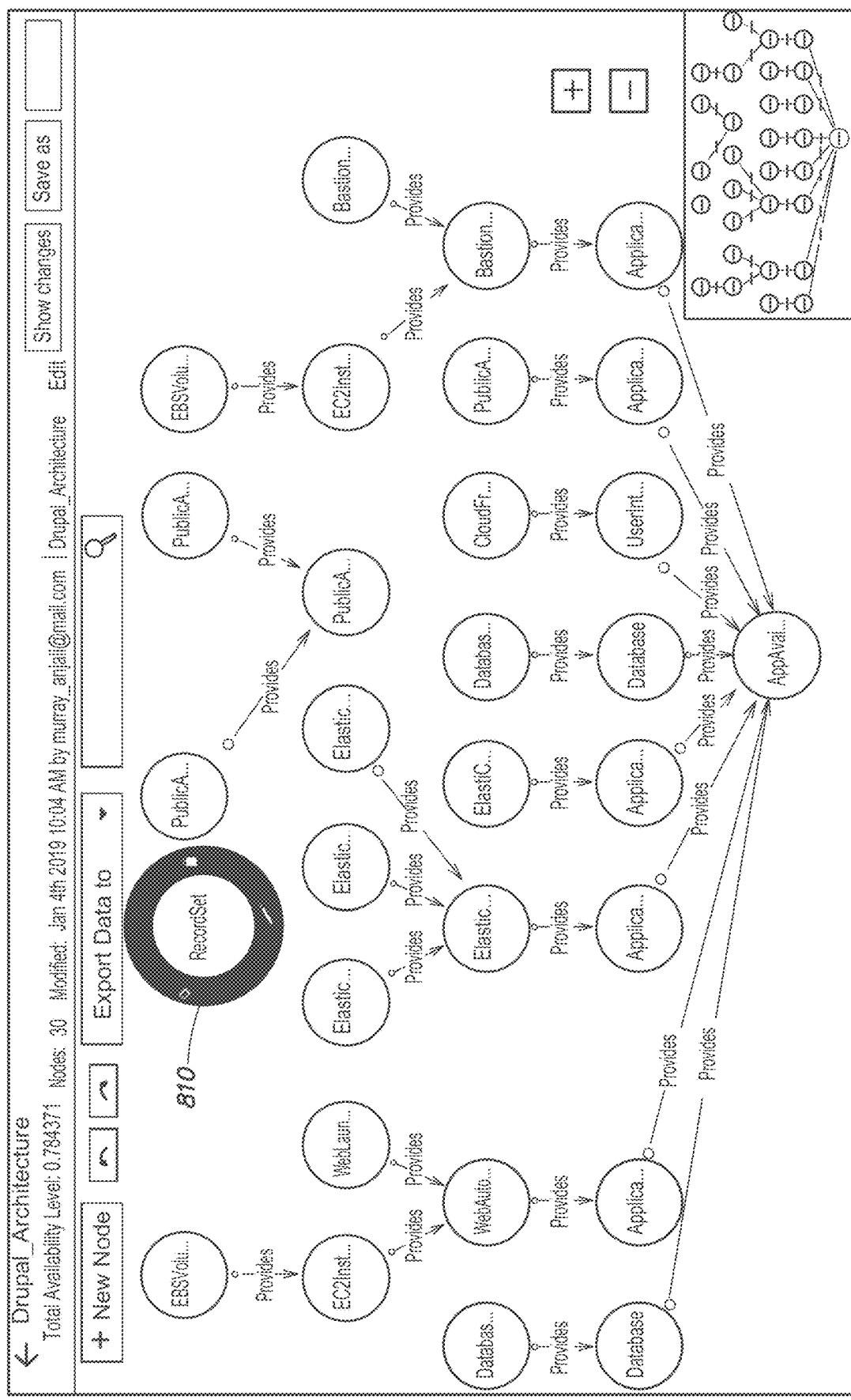
FIG. 7 is an example of how a user may modify the Availability Graph by adding a resource.

In FIG. 7, the user has determined there should be a new node representing a new resource, RecordSet 810, added to attempt to improve availability.

Figure 8:
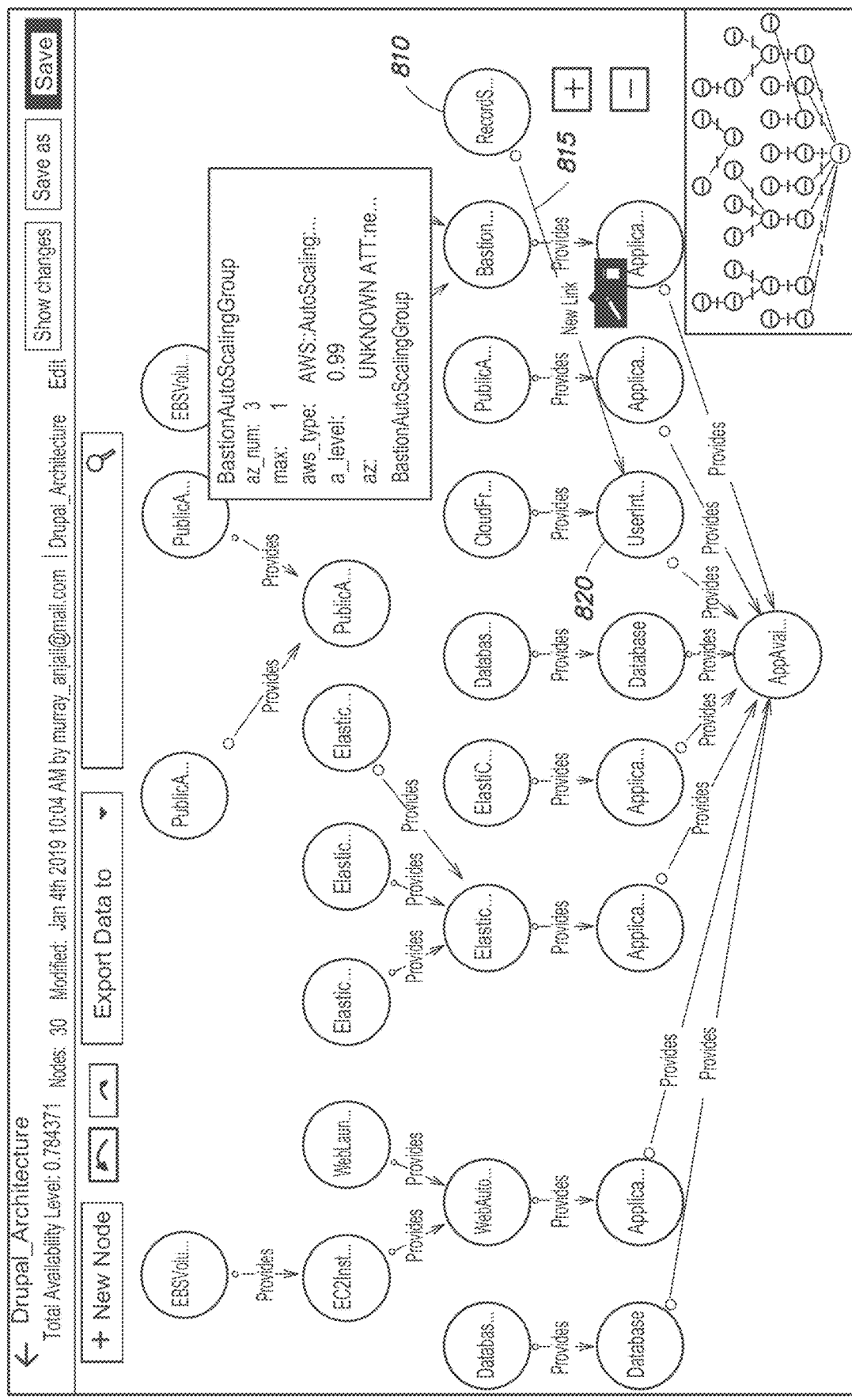
FIG. 8 illustrates how the user may add a new relationship between resources.

In FIG. 8, the new RecordSet node 810 is now visible in the graph, and the user has also added a dependency 815 between that new RecordSet function 810 and the User Interface 820.

Figure 9:
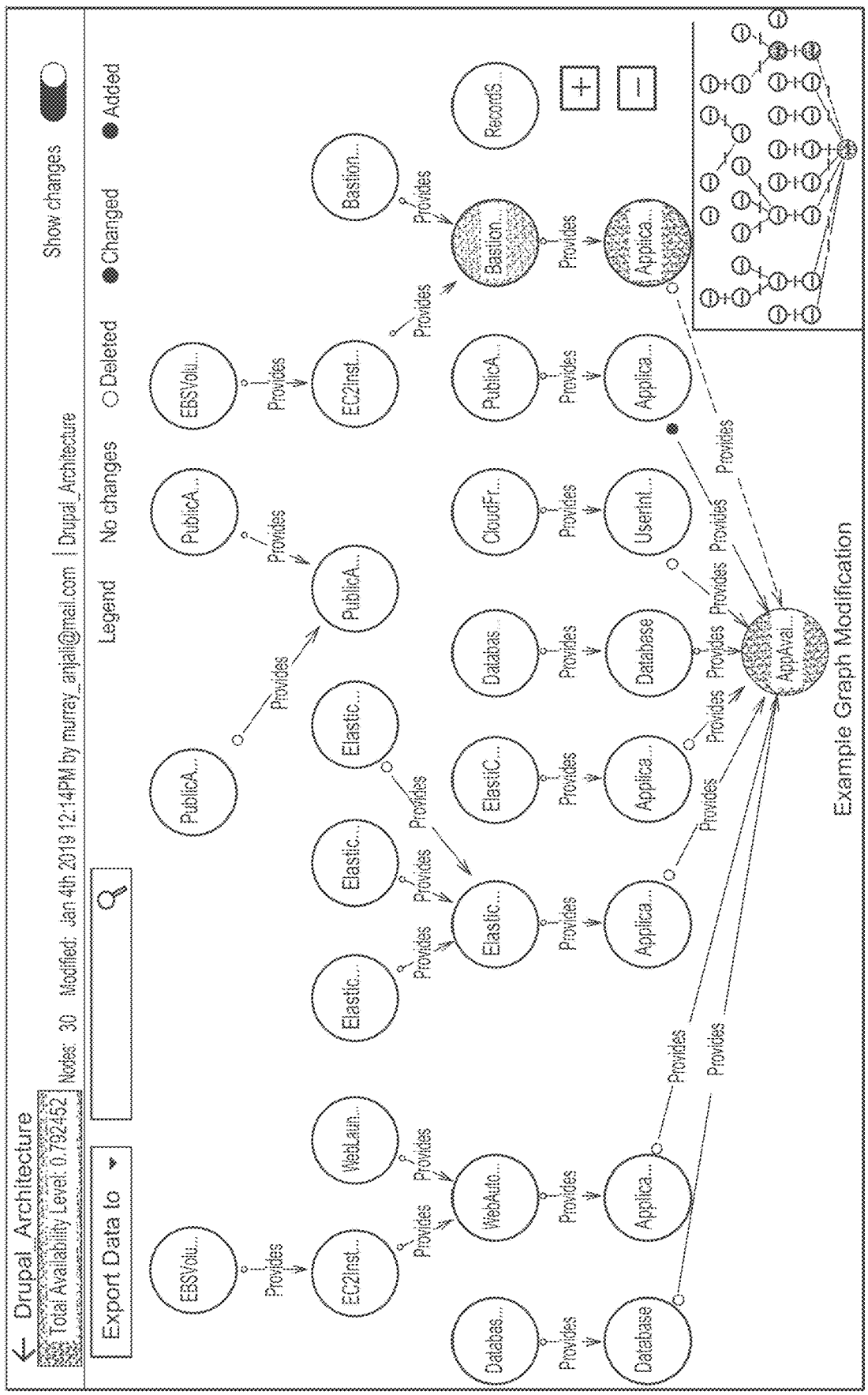
FIG. 9 is another example Availability Graph modification.

In FIG. 9, the user is in the process of modifying the graph in yet other ways. Here, the "Show changes" view is enabled at the top right side of the GUI 105. The user is now editing the Application resource to the BastionAutoScalingGroup. Although not shown in FIG. 9, she may confirm an overall improvement has been achieved, by again hovering the mouse over the AppAvailablity node.

Figure 10:
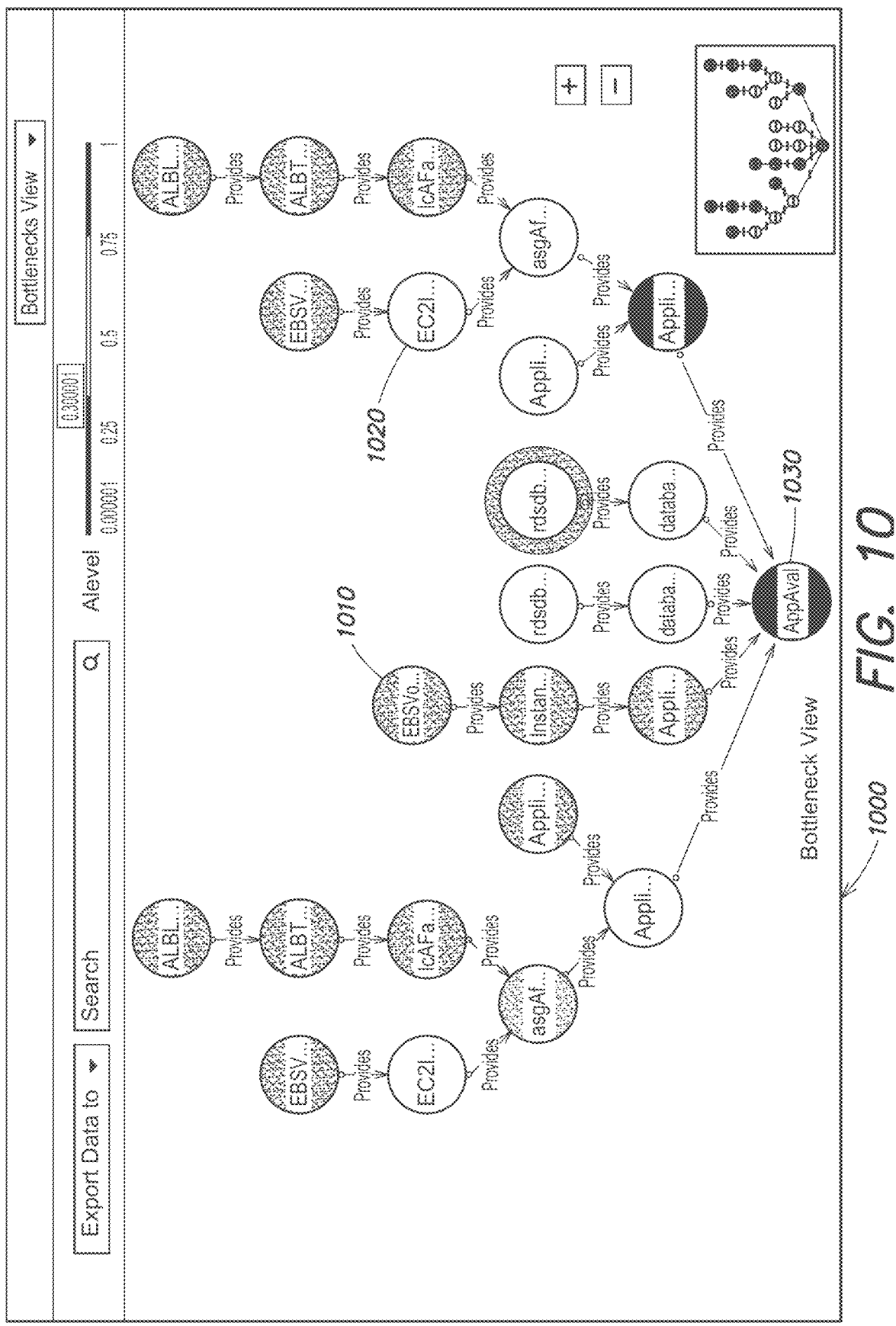
FIG. 10 shows a bottleneck view of the Resource Graph.

This manual hunt for improvements may become somewhat tedious especially for complex environments. In those situations, the user may wish to leverage a Bottleneck View such as shown in FIG. 10. Here the resource nodes such as node 1010 highlighted in one shade or color (medium gray or green) have a higher availability than other resources 1020 highlighted in another color or shade (yellow or light gray). Similarly, the yellow-colored resources 1020 have a higher availability than still other resources 1030 highlighted still differently (dark gray or red). A slider bar at the top right can be used to set threshold values for the respective red, yellow and green availability levels. Here the user has set the thresholds so that any resource that has an availability above 75% will be green (medium gray), anything lower than 75% but greater than 35% will be colored yellow (light gray), and anything below 30% will be red (dark gray). The threshold values between green and yellow and yellow and red can set to any value between 0 and 1. As a result, the user can now color-code the Availability Graph based on how she sets the desired availability thresholds. The color-coding highlights specific areas in the graph where the user may want to consider making an improvement.

In some arrangements, information relating to different elements of the Availability Graph may be "bubbled" up or collapsed into a single node, to make viewing a larger context easier.

In addition, the AFactor edit process may access a library of nodes used to implement different resources. For example, the user might simply specify that a web server should be added to a part of the graph, and AFactor adds a predetermined configuration of resources needed to implement that web server. Or the user may, within the context of CloudFormation, select a predefined template.

The foregoing description of example embodiments provides illustration and description of systems and methods for implementing an availability analysis tool, but is not intended to be exhaustive or to limited to the precise form disclosed.

For example, it should be understood that the embodiments described above may be implemented in many different ways. In some instances, the various "data processing systems" described herein may each be implemented by a separate or shared physical or virtual general purpose computer having a central processor, memory, disk or other mass storage, communication interface(s), input/output (I/O) device(s), and other peripherals. The general purpose computer is transformed into the processors with improved functionality, and executes the processes described above to provide improved operations. The processors may operate, for example, by loading software instructions, and then executing the instructions to carry out the functions described.

As is known in the art, such a computer may contain a system bus, where a bus is a set of hardware lines used for data transfer among the components of a computer or processing system. The bus or busses are shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing. By aggregating demand from multiple users in central locations, cloud computing environments can be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. It further should be understood that certain implementations may dictate the block and network diagrams and the number of block and network diagrams illustrating the execution of the embodiments be implemented in a particular way.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will thus be apparent, however, that other variations and modifications may be made to the described embodiments, with the attainment of some or all of their advantages. Therefore, it is the object of the appended claims to cover all such variations and modifications as come within the true spirit and scope of the disclosure and their equivalents.

The invention claimed is:

1. A method for specifying information technology (IT) resources needed to implement an application or service comprising:
   receiving an input template that describes attributes of one or more IT resources needed to implement the application or service;
   determining an availability value for one or more of the resources;

generating a graph from the input template where nodes in the graph represent resources, and links between the nodes represent dependencies of a resource on another resource;

associating availability factors with one or more of the nodes in the graph, the availability factors initially depending on the availability values;

analyzing dependencies among two or more nodes to determine a revised availability factor for at least one other node;

exporting the graph as a revised template;

instantiating the application or service from the revised template;

wherein the nodes in the graph are arranged as leaf nodes and root nodes; and the step of analyzing dependencies further comprises:
  analyzing two or more adjacent leaf nodes to determine an availability factor for a root node associated with the adjacent leaf nodes.

2. The method of claim 1 additionally comprising the step of:
  displaying the graph; and
  operating a user interface for accepting modifications to the graph.

3. The method of claim 2 wherein one or more of the availability factors are obtained via the user interface.

4. The method of claim 1 wherein one or more steps of the method operate as a cloud service.

5. The method of claim 2 wherein the user interface is further used for displaying bottlenecks in the graph.

6. The method of claim 5 wherein bottlenecks are indicated by differentiating resources on the display of the graph with a color that depends upon each resource's availability factor.

7. The method of claim 6 wherein a selected color indicates availability factors within a predetermined range.

8. The method of claim 7 wherein the predetermined range is selected via the user interface.

9. The method of claim 1 wherein the input template associates two or more availability values with a given resource, and
  further generating the graph by selecting the availability factor for given resource depending upon a configuration of the input template.

10. An apparatus for specifying information technology (IT) resources needed to implement an application or service comprising:
  one or more processors;
  one or more non-transitory memory devices coupled to the one or more processors, the one or more non-transitory memory devices storing a set of instructions that when executed by the one or more processors cause the one or more processors to perform operations including:
    receiving an input template that describes attributes of one or more IT resources needed to implement the application or service;
    determining an availability value for one or more of the resources;
    generating a graph from the input template where nodes in the graph represent resources, and links between the nodes represent dependencies of a resource on another resource;
    associating availability factors with one or more of the nodes in the graph, the availability factors initially depending on the availability values;
    analyzing dependencies among two or more nodes to determine a revised availability factor for at least one other node;
    exporting the graph as a revised template;
    instantiating the application or service from the revised template;
    wherein the nodes in the graph are arranged as leaf nodes and root nodes; and
    the step of analyzing dependencies further comprises:
      analyzing two or more adjacent leaf nodes to determine the revised availability factor for a root node associated with the adjacent leaf nodes.

11. The apparatus of claim 10 wherein the operations additionally comprise:
  displaying the graph; and
  operating a user interface for accepting modifications to the graph.

12. The apparatus of claim 11 wherein one or more of the availability factors are obtained via the user interface.

13. The apparatus of claim 10 wherein one or more processors operate as a cloud service.

14. The apparatus of claim 11 wherein the operations further comprise:
  providing a user interface for displaying bottlenecks in the graph.

15. The apparatus of claim 14 wherein bottlenecks are indicated by differentiating resources on the display of the graph with a color that depends upon each resource's availability factor.

16. The apparatus of claim 15 wherein a selected color indicates availability factors within a predetermined range.

17. The apparatus of claim 16 wherein the operations further comprise:
  selecting a predetermined range via the user interface.

18. The apparatus of claim 10 wherein the operations further comprise:
  associating two or more availability values with a given resource; and
  generating the graph by additionally selecting the availability factor for given resource depending upon a configuration of the input template.

* * * * *